(12) United States Patent
Xu

(10) Patent No.: US 12,364,256 B1
(45) Date of Patent: Jul. 22, 2025

(54) FISHING ROD HOLDER

(71) Applicant: Yuerui Xu, Jieyang (CN)

(72) Inventor: Yuerui Xu, Jieyang (CN)

( * ) Notice: Subject to any disclaimer, the term of this patent is extended or adjusted under 35 U.S.C. 154(b) by 0 days.

(21) Appl. No.: 18/971,051

(22) Filed: Dec. 6, 2024

(51) Int. Cl.
*A01K 97/10* (2006.01)
*A47B 81/00* (2006.01)
*F16B 2/00* (2006.01)
*F16B 2/18* (2006.01)

(52) U.S. Cl.
CPC .......... *A01K 97/10* (2013.01); *A47B 81/005* (2013.01); *F16B 2/005* (2013.01); *F16B 2/18* (2013.01)

(58) Field of Classification Search
CPC ....... A01K 97/10; A47B 81/005; F16B 2/005; F16B 2/18
USPC .................................................. 211/68, 70.8
See application file for complete search history.

(56) References Cited

U.S. PATENT DOCUMENTS

| | | | | | |
|---|---|---|---|---|---|
| 649,115 | A | * | 5/1900 | Stevens | A47K 1/09 |
| | | | | | 211/67 |
| 1,306,585 | A | * | 6/1919 | Droege et al. | A47L 13/512 |
| | | | | | 248/113 |
| 1,393,265 | A | * | 10/1921 | Cooper | A63D 15/10 |
| | | | | | 211/68 |
| 1,428,810 | A | * | 9/1922 | Shoemaker | E05B 73/02 |
| | | | | | 70/59 |
| 1,563,817 | A | * | 12/1925 | Wright | A47L 13/512 |
| | | | | | 248/113 |
| 1,589,616 | A | * | 6/1926 | Alford | A47L 13/512 |
| | | | | | 248/113 |
| 1,609,666 | A | * | 12/1926 | Settevig | A47L 13/512 |
| | | | | | 248/113 |
| 1,719,360 | A | * | 7/1929 | Deike | A63B 55/10 |
| | | | | | 211/70.2 |
| 2,370,876 | A | * | 3/1945 | Richardson | A63D 15/10 |
| | | | | | 248/113 |
| 2,488,709 | A | * | 11/1949 | Colwell | A47G 1/21 |
| | | | | | 267/155 |
| 2,869,209 | A | * | 1/1959 | Kautzky | A63C 11/028 |
| | | | | | 248/113 |

(Continued)

FOREIGN PATENT DOCUMENTS

| | | | | |
|---|---|---|---|---|
| DE | 4434820 A1 | * | 2/1995 | ............... B25B 5/08 |
| DE | 29919416 U1 | * | 1/2000 | ........... A47L 13/512 |

(Continued)

*Primary Examiner* — Stanton L Krycinski
(74) *Attorney, Agent, or Firm* — Cooper Legal Group LLC

(57) ABSTRACT

A fishing rod holder includes a bottom plate, a plurality of blocking plates, and a plurality of clamping components. The plurality of blocking plates and the plurality of clamping components are all arranged on an identical surface of the bottom plate. One clamping component is provided corresponding to one blocking plate. One end of the clamping component is close to the corresponding blocking plate and is movable away from the corresponding blocking plate under an external force. When the end of the clamping component is driven away from the corresponding blocking plate by the external force, the clamping component has a restoration force, so that when the clamping component is driven away from the corresponding blocking plate by the external force, the clamping component approaches the corresponding blocking plate, and a clamping space is formed between the clamping component and the blocking plate.

18 Claims, 8 Drawing Sheets

(56) References Cited

U.S. PATENT DOCUMENTS

| | | | | |
|---|---|---|---|---|
| 3,265,032 A * | 8/1966 | Hume | B63B 21/08 | 114/99 |
| 3,421,632 A * | 1/1969 | Wood | A47B 81/005 | 248/110 |
| 3,795,218 A * | 3/1974 | Merry | B63B 21/08 | 114/218 |
| 4,134,499 A * | 1/1979 | Joswig | B25H 3/04 | 248/316.3 |
| 4,217,847 A * | 8/1980 | McCloud | B63B 21/08 | 188/65.1 |
| D270,880 S * | 10/1983 | Poland | D6/552 | |
| 4,674,722 A * | 6/1987 | Danby | F16M 11/16 | 248/124.2 |
| 4,766,835 A * | 8/1988 | Randall | F16G 11/106 | 24/134 P |
| 4,899,423 A * | 2/1990 | Randall | A43C 7/08 | 24/134 P |
| 4,956,897 A * | 9/1990 | Speedie | A43C 3/04 | 24/134 P |
| 5,125,761 A * | 6/1992 | Cullen | F16B 2/18 | 403/314 |
| 5,183,164 A * | 2/1993 | Heinzle | A63C 11/028 | 211/70.5 |
| 5,417,335 A * | 5/1995 | White | A47B 81/005 | D6/552 |
| 5,852,853 A * | 12/1998 | Pennoyer, Jr. | F16G 11/106 | 24/134 P |
| 6,105,915 A * | 8/2000 | Naman | A47L 13/512 | 248/113 |
| 6,178,604 B1 * | 1/2001 | Pennoyer, Jr. | F16G 11/106 | 24/134 P |
| 6,435,357 B1 * | 8/2002 | Lee | B25H 3/04 | 211/94.01 |
| 6,474,612 B2 * | 11/2002 | Ross, Jr. | A63D 15/10 | 248/316.2 |
| 7,287,304 B2 * | 10/2007 | Zebe, Jr. | F16G 11/106 | 24/134 P |
| 7,337,504 B1 * | 3/2008 | Casey | B63B 21/08 | 24/134 P |
| 7,503,459 B2 * | 3/2009 | Grayson | A47F 7/0028 | 211/70.8 |
| 7,722,632 B2 * | 5/2010 | Rothstein | A61B 17/06061 | 606/148 |
| D659,520 S * | 5/2012 | Stock | D8/373 | |
| 9,193,063 B2 * | 11/2015 | Huang | F16B 2/14 | |
| 9,382,699 B2 * | 7/2016 | Andersen | F16B 2/18 | |
| 9,598,148 B2 * | 3/2017 | Volkwein | B63B 21/08 | |
| 9,611,875 B2 * | 4/2017 | Likosar | A63C 11/02 | |
| D968,844 S * | 11/2022 | Jenson | D6/552 | |
| 11,751,684 B2 * | 9/2023 | Bedard | A01K 97/10 | 211/70.8 |
| 12,127,894 B2 * | 10/2024 | Lea | A61L 2/26 | |
| 2003/0080079 A1 * | 5/2003 | Wu | F16B 2/16 | 211/89.01 |
| 2006/0208138 A1 * | 9/2006 | Huang | A46B 17/08 | 248/110 |
| 2006/0243686 A1 * | 11/2006 | Grayson | A47B 81/005 | 211/70.6 |
| 2007/0120021 A1 * | 5/2007 | Lin | F16B 2/18 | 248/49 |
| 2009/0044478 A1 * | 2/2009 | Yeh | A47L 13/512 | 52/584.1 |
| 2011/0114580 A1 * | 5/2011 | Chen | B25H 3/04 | 211/70.6 |
| 2012/0049020 A1 * | 3/2012 | Stock | B25H 3/04 | 248/316.5 |

FOREIGN PATENT DOCUMENTS

| | | | | |
|---|---|---|---|---|
| DE | 10353254 A1 * | 6/2005 | | B63B 21/08 |
| EP | 0492892 A1 * | 7/1992 | | |
| FR | 2305627 A1 * | 10/1976 | | |
| FR | 2567594 A1 * | 1/1986 | | |

* cited by examiner

FISHING ROD HOLDER

TECHNICAL FIELD

The present invention relates to a fishing rod holder, applied in the technical field of fishing gear.

BACKGROUND ART

With the continuous improvement of people's living standards, in leisure time, people are more willing to choose outdoor sports to relax and get close to nature, and fishing is one of people's favorite outdoor activities. Fishing rods are the most common fishing gear in the sport of fishing, and most fishing enthusiasts are usually equipped with a plurality of fishing rods. An elongated rod portion of the fishing rod is easily damaged and cannot be placed arbitrarily. For most of the existing fishing rod holders in the market, corresponding placement slots generally cannot be adjusted and cannot adapt to different fishing rods. Moreover, most styles are basically equipped with a base and a placement slot. The base is placed on the ground, which takes up a lot of space and cannot meet the storage needs of some experienced anglers.

SUMMARY

In order to solve the above-mentioned problems that corresponding placement slots of most of the fishing rod holders in the prior art are generally not adjustable and cannot be adapted to different fishing rods, most styles are basically equipped with a base and a placement slot, and the base is placed on the ground, which occupies a large space and cannot meet the storage needs of some experienced anglers, a fishing rod holder is provided in the present invention. Through a restoration force of a clamping component, the fishing rod holder can be used for fishing rods of different sizes, making it easy for a user to place the fishing rods. The use is easy, convenient and efficient, and the clamping is also very stable.

The technical solution adopted by the present invention to solve its technical problems is as follows. A fishing rod holder is provided in the present invention. The fishing rod holder includes a bottom plate, a plurality of blocking plates, and a plurality of clamping components. The plurality of blocking plates and the plurality of clamping components are all arranged on an identical surface of the bottom plate. One of the clamping components is provided corresponding to one of the blocking plates. One end of the clamping component is close to the corresponding blocking plate and is movable away from the corresponding blocking plate under an external force. When the end of the clamping component is driven away from the corresponding blocking plate by the external force, the clamping component has a restoration force, so that the clamping component approaches the corresponding blocking plate when the clamping component is driven away from the blocking plate by the external force. When the end of the clamping component is driven away from the corresponding blocking plate by the external force, a clamping space can be formed between the clamping component and the blocking plate.

Furthermore, the fishing rod holder further includes first anti-slip pads. The first anti-slip pad is disposed on one side of the clamping component near the corresponding blocking plate.

Furthermore, the first anti-slip pad is transversely distributed on the clamping component.

Furthermore, an outer surface of the first anti-slip pad is provided with a plurality of first transverse anti-slip bars and a plurality of second transverse anti-slip bars, and both the first transverse anti-slip bars and the second transverse anti-slip bars are transversely distributed on the first anti-slip pad. A width of the first transverse anti-slip bar is greater than a width of the second transverse anti-slip bar. A height of the first transverse anti-slip bar and a height of the second transverse anti-slip bar are identical. The second transverse anti-slip bars are provided between every two of the first transverse anti-slip bars.

Furthermore, the fishing rod holder further includes second anti-slip pads. The second anti-slip pad is arranged on the blocking plate and opposite to the first anti-slip pad of the corresponding clamping component.

Furthermore, insertion slots are defined in two ends of one side surface of the blocking plate equipped with the second anti-slip pad. Two ends of the second anti-slip pad are provided with insertion blocks corresponding to the insertion slots. The insertion blocks are detachably inserted into the insertion slots.

Furthermore, the insertion block is in interference fit with the insertion slot.

Furthermore, the insertion slot is arranged in a trapezoidal shape, and a width of the insertion slot gradually decreases in a direction away from a bottom portion of the insertion slot.

Furthermore, an outer surface of the second anti-slip pad is provided with a plurality of third transverse anti-slip bars and a plurality of fourth transverse anti-slip bars, and both the third transverse anti-slip bars and the fourth transverse anti-slip bars are transversely distributed on the second anti-slip pad. A width of the third transverse anti-slip bar is greater than a width of the fourth transverse anti-slip bar. A height of the third transverse anti-slip bar and a height of the fourth transverse anti-slip bar are identical. The fourth transverse anti-slip bars are provided between every two of the third transverse anti-slip bars.

Furthermore, the plurality of clamping components each includes an abutting member and an elastic restoration member. The abutting member is used for clamping a fishing rod with the corresponding blocking plate. The elastic restoration member is arranged between the abutting member and the bottom plate. The elastic restoration member is used for driving one end of the abutting member that is away from the corresponding blocking plate to approach the corresponding blocking plate when the abutting member is moved away from the corresponding blocking plate by the external force.

Furthermore, the bottom plate is provided with first installation columns. The abutting member is provided with a second installation column. The first installation column and the second installation column are mutually inserted and are movable relative to each other. The elastic restoration member is rotatably sleeved on the first installation column and the second installation column, and the elastic restoration member is provided with a first extension end and a second extension end. The first extension end is connected to the bottom plate, and the second extension end abuts against the abutting member. When one end of the abutting member near the corresponding blocking plate moves away from the corresponding blocking plate, the second extension end has a restoration force, and the second extension end drives the end of the abutting member that is away from the corresponding blocking plate to approach the corresponding blocking plate.

Furthermore, a first installation slot is defined in the bottom plate and is positioned on a periphery of the first installation column. The bottom plate is also provided with a second installation slot and a first installation hole. The second installation slot is in communication with the first installation slot, and the first installation hole is defined in the second installation slot and is far away from the first installation slot. A main body of the elastic restoration member is arranged in the first installation slot. The first extension end is arranged in the second installation slot, and one end of the first extension end far away from the main body of the elastic restoration member is inserted into the first installation hole, so that the first extension end is fixed in the second installation slot.

Furthermore, the plurality of clamping components also each includes a fixing member. The bottom plate is provided with second installation holes corresponding to the first installation columns. The second installation hole penetrates through the bottom plate. The fixing member is inserted into the first installation column and the second installation column through the second installation hole, and the fixing member fixes the second installation column to the first installation column. The second installation column is movably connected to the fixing member.

Furthermore, the fixing member is a bolt or a screw.

Furthermore, the clamping component is provided with three side surfaces. A first side surface of the clamping component is arranged opposite to the corresponding blocking plate. A second side surface of the clamping component is arranged opposite to the first side surface of the clamping component. A third side surface of the clamping component is connected to the first side surface of the clamping component and the second side surface of the clamping component. The third side surface of the clamping component is arranged far away from the corresponding blocking plate. The first side surface of the clamping component is connected to the second side surface of the clamping component to form a conical shape. The first side surface of the clamping component is arranged in a smooth arc shape.

Furthermore, the second side surface of the clamping component is provided with a first plane and a second plane. The first plane and the second plane are connected and form an included angle α greater than 90 degrees. The first plane is connected to the first side surface of the clamping component, and an extension line of the first plane is perpendicular to the third side surface.

Furthermore, the second side surface of the clamping component is also provided with a third plane. The third plane is connected to the third side surface of the clamping component and the second plane. The third plane is parallel to the first plane.

Furthermore, the clamping component includes a hollow column and a cover plate. The cover plate covers a top portion of the hollow column, and a side wall of the cover plate encloses the hollow column. The first plane and the second plane are both arranged on the side wall of the cover plate.

Furthermore, anti-slip patterns are provided on both sides of a length direction of the bottom plate.

Furthermore, one of the clamping components is provided between two of the blocking plates, and the clamping component is rotatable between the two of the blocking plates. The clamping component has the restoration force when rotated by the external force.

Beneficial effects of the present invention are as follows. The fishing rod holder is provided in the present invention, which can be used for fishing rods of different sizes through the restoration force of the clamping component, making it easy for the user to place fishing rods. The use is simple, convenient, and efficient, and the clamping is also very stable. The plurality of clamping components and corresponding blocking plates are arranged, making it easy for the user to store a plurality of fishing rod racks. The first anti-slip pad and the second anti-slip pad are also arranged. The fishing rod can generate friction between the anti-slip pad of the clamping component and the anti-slip pad of the blocking plate under its own gravity, and is clamped based on the friction, thereby achieving the stability of the fishing rod and preventing the fishing rod from falling off, and improving the storage stability of the fishing rod holder. The shape of the side surfaces of the clamping component is arranged to facilitate the user's hand to apply force on the clamping component, and further facilitate the user's use of the fishing rod holder.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
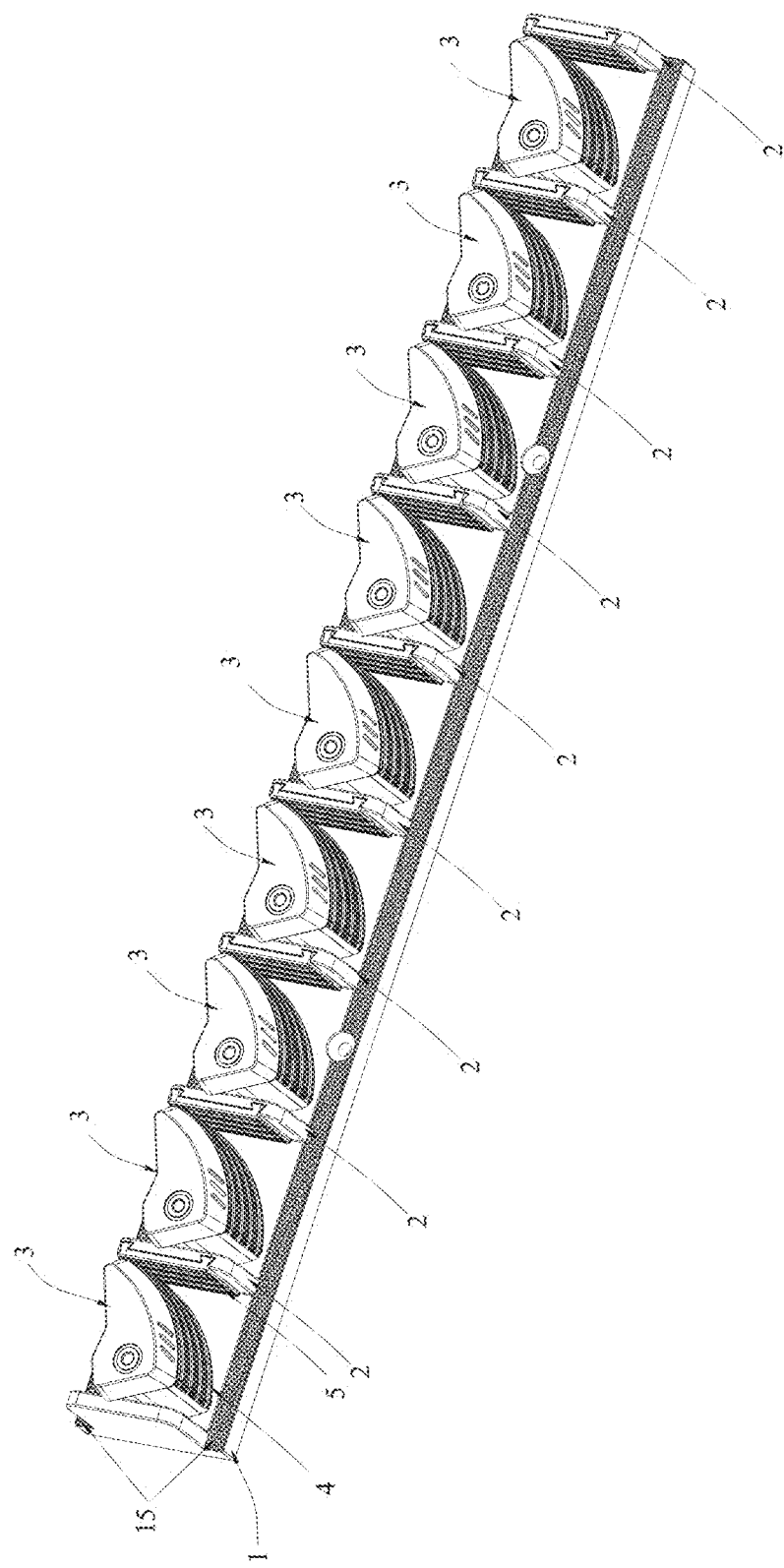
FIG. 1 is a perspective view of a fishing rod holder according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features.

Thus, the features defined as "first" and "second" may explicitly or implicitly include one or more of the features. In the description of embodiments of the application, "a plurality of" means two or more, unless otherwise specifically defined.

Figure 2:
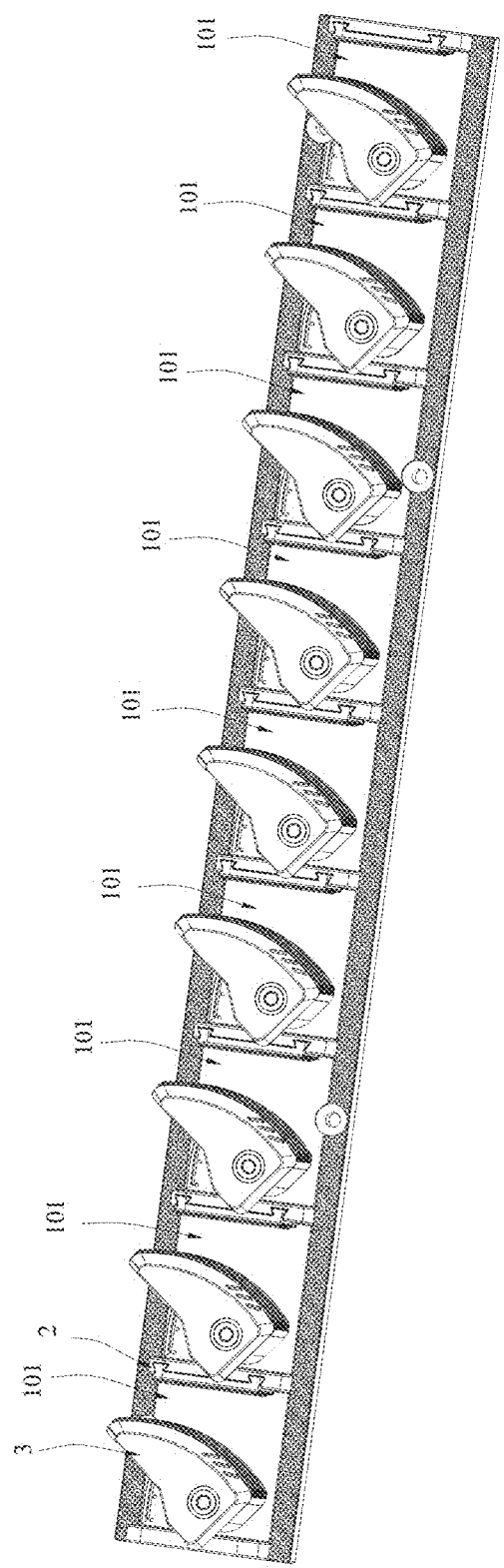
FIG. 2 is a usage state diagram of a fishing rod holder according to the present invention.
Figure 3:
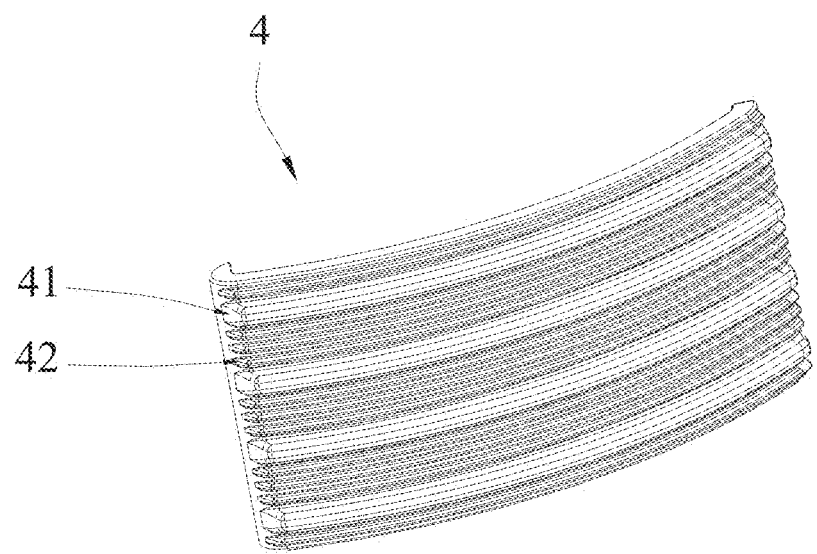
FIG. 3 is a perspective view of a first anti-slip pad according to the present invention.
Figure 4:
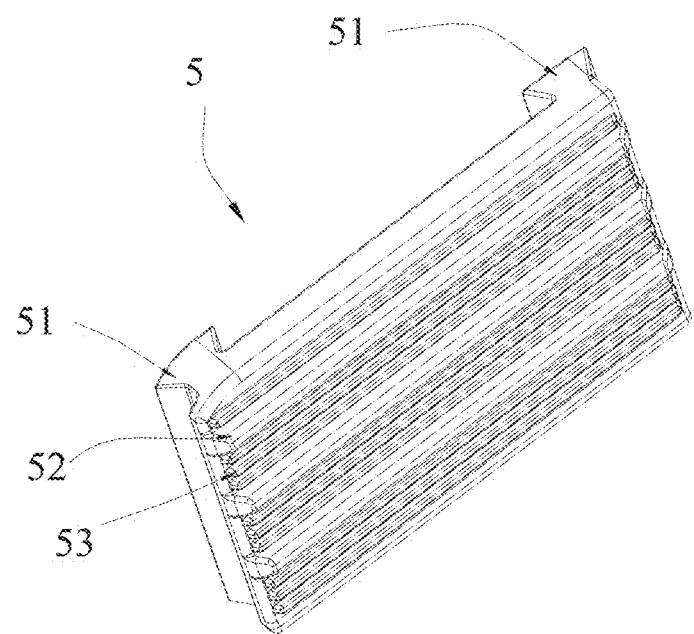
FIG. 4 is a perspective view of a second anti-slip pad according to the present invention.
Figure 5:
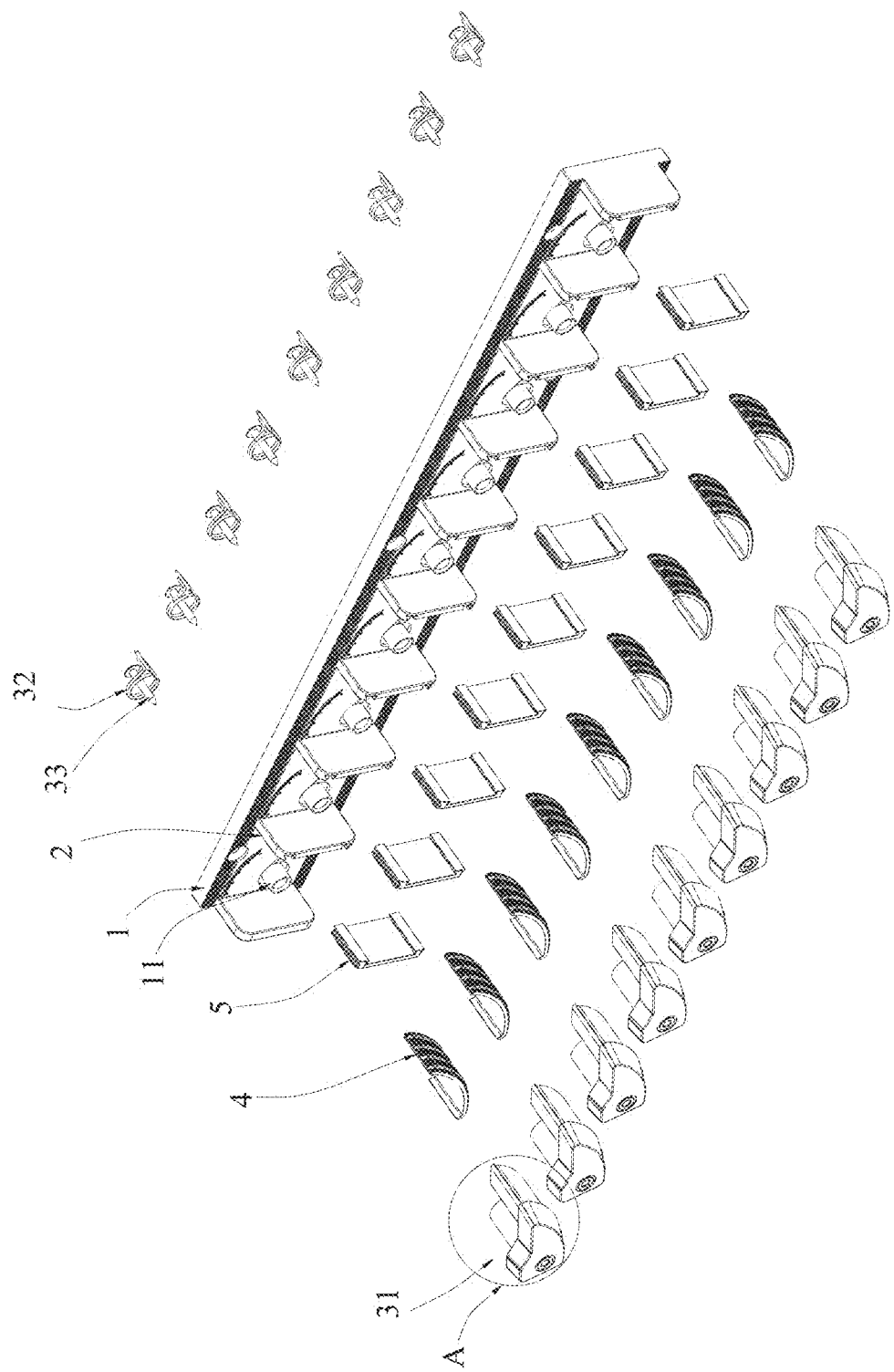
FIG. 5 is an exploded view of a fishing rod holder according to the present invention.
Figure 6:
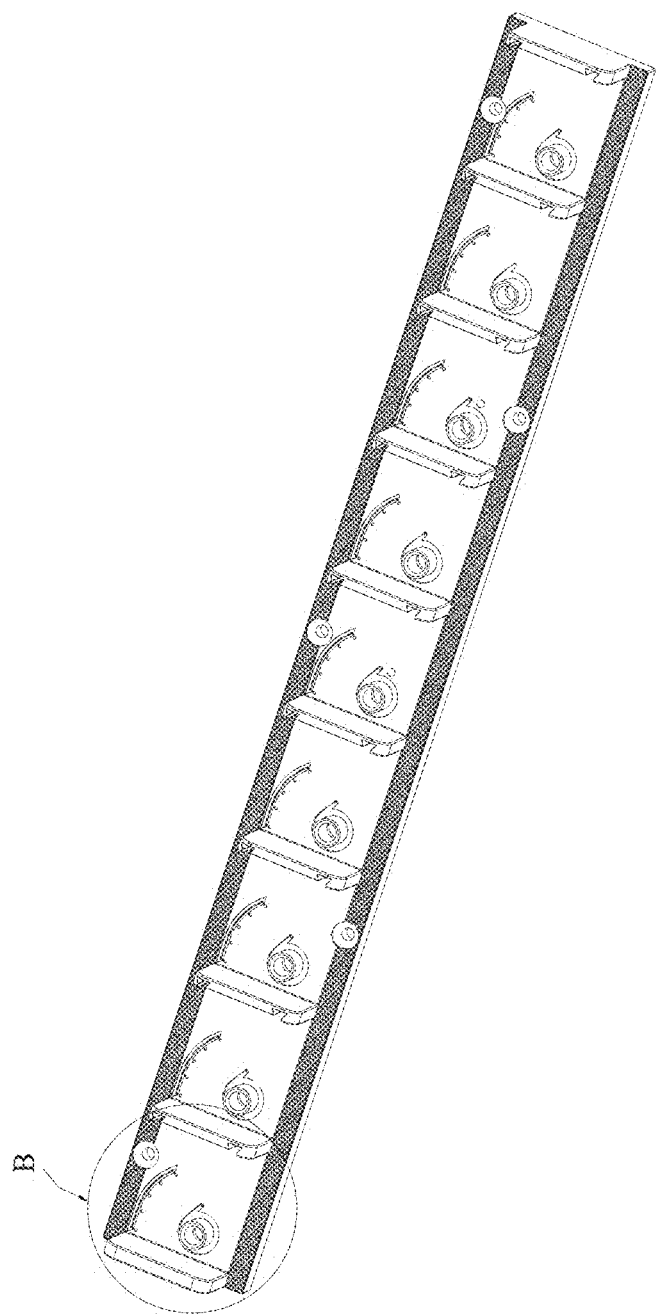
FIG. 6 is a perspective view of a bottom plate according to the present invention.
Figure 7:
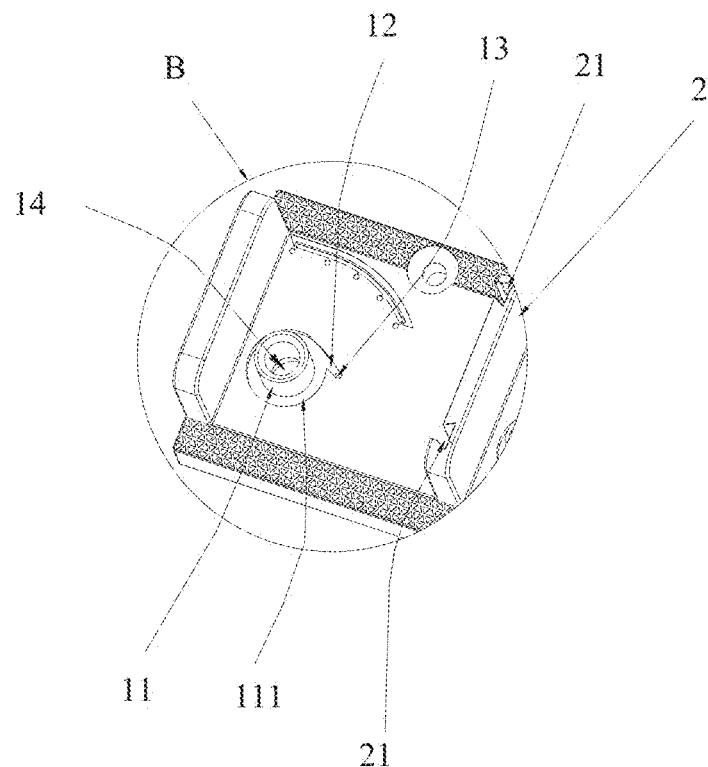
FIG. 7 is an enlarged view of area B in FIG. 6 according to the present invention.
Figure 8:
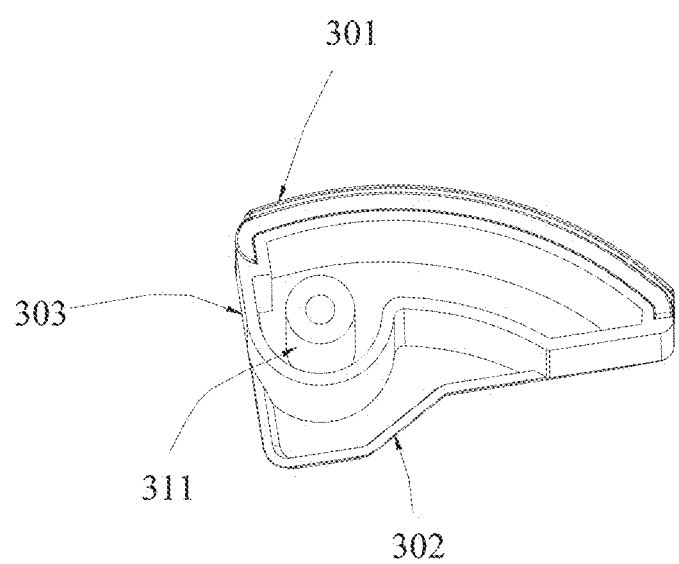
FIG. 8 is a perspective view of a rear surface of an abutting member according to the present invention.
Figure 9:
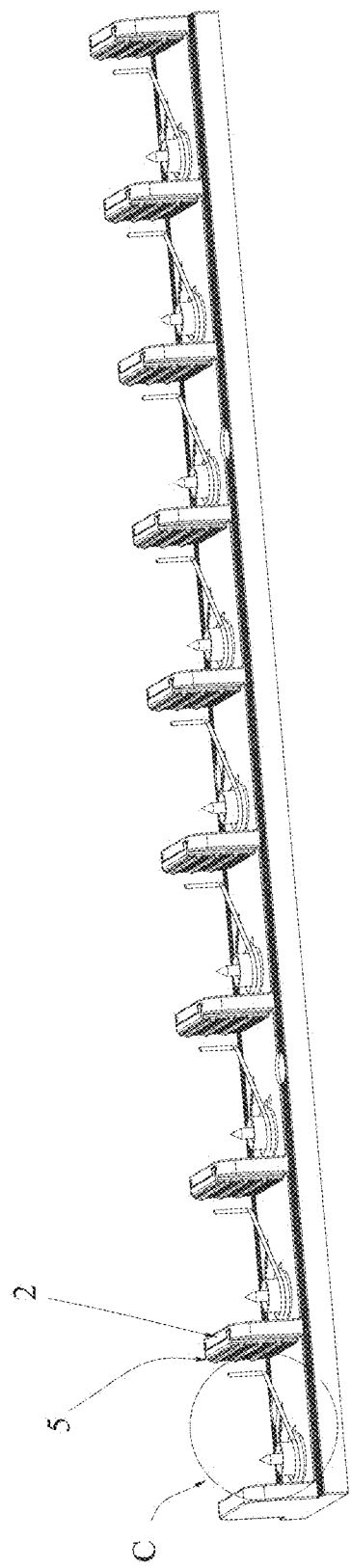
FIG. 9 is a schematic diagram of installation of an elastic restoration member according to the present invention.
Figure 10:
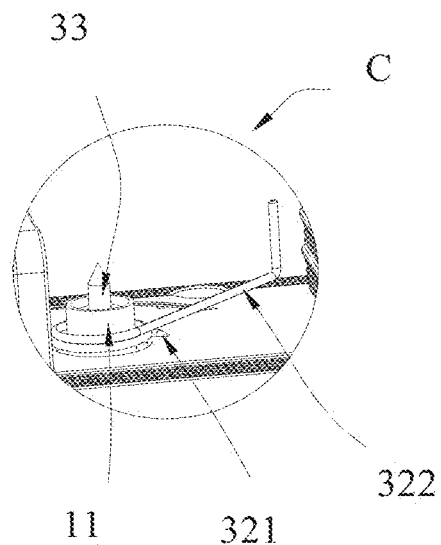
FIG. 10 is an enlarged view of area C in FIG. 9 according to the present invention.
Figure 11:
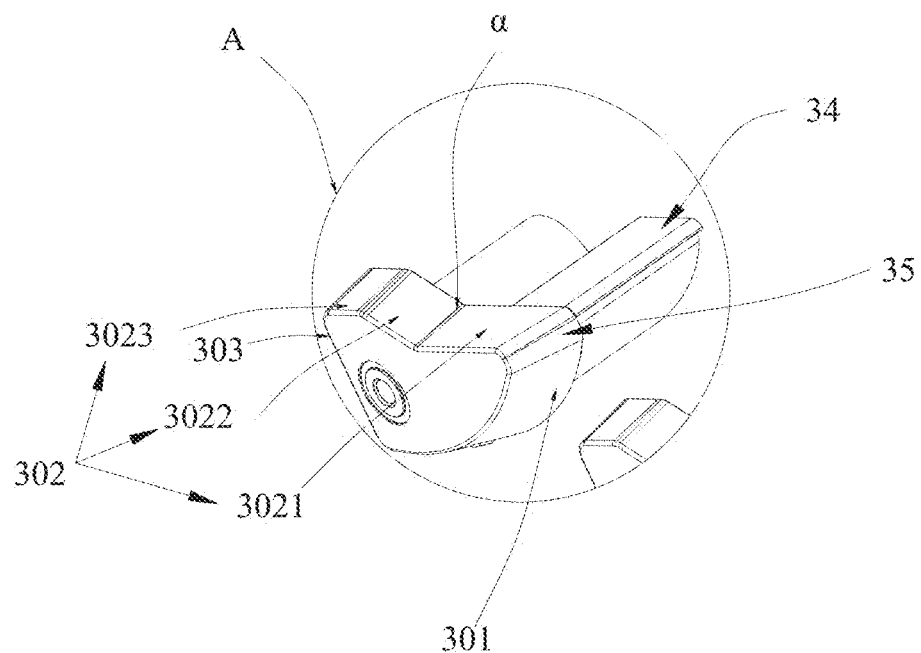
FIG. 11 is an enlarged view of area A in FIG. 5 according to the present invention.

Referring to FIGS. 1-11, a fishing rod holder is provided in the present invention. The fishing rod holder includes a bottom plate 1, a plurality of blocking plates 2, and a plurality of clamping components 3. The plurality of blocking plates 2 and the plurality of clamping components 3 are all arranged on an identical surface of the bottom plate 1. One of the clamping components 3 is provided corresponding to one of the blocking plates 2. It should be noted that one end of the clamping component 3 is close to the corresponding blocking plate 2. Otherwise, a gap is too large, a small fishing rod cannot be stably clamped by the blocking plate 2 and the clamping component 3. Moreover, the end of the clamping component 3 is movable away from the corresponding blocking plate 2 under an external force. When the end of the clamping component 3 is driven away from the corresponding blocking plate 2 by the external force, the clamping component 3 has a restoration force. The restoration force of the clamping component in this embodiment is relatively strong, which can stably clamp the fishing rod, and can make the clamping component 3 approach the corresponding blocking plate 2 when the clamping component 3 is driven away from the blocking plate 2 by the external force. Moreover, when the end of the clamping component 3 is driven away from the corresponding blocking plate 2 by the external force, a clamping space 101 can be formed between the clamping component 3 and the blocking plate 2. That is to say, the restoration force of the clamping component makes it easy for a user to place the fishing rod without too many complex processes, and the clamping is also relatively stable.

In this embodiment, the fishing rod holder further includes first anti-slip pads 4. The first anti-slip pad 4 is disposed on one side of the clamping component 3 near the corresponding blocking plate 2, so as to prevent a surface of the clamping component 3 from being too smooth. A surface of the fishing rod is also too smooth. If the restoration force of the clamping component 3 is large, the clamping component 3 and the blocking plate 2 will rub against each other, causing wear and tear on the fishing rod. Therefore, in order to prevent unnecessary wear and tear on the fishing rod, and to make the fishing rod holder more stable in fixing the fishing rod, the first anti-slip pad is provided on the clamping component.

In this embodiment, the first anti-slip pad 4 is transversely distributed on the clamping component 3, which facilitates the installation and arrangement of the first anti-slip pad, and also makes the appearance of the fishing rod holder more beautiful.

In this embodiment, an outer surface of the first anti-slip pad 4 is provided with a plurality of first transverse anti-slip bars 41 and a plurality of second transverse anti-slip bars 42, and both the first transverse anti-slip bars 41 and the second transverse anti-slip bars 42 are transversely distributed on the first anti-slip pad 4. A width of the first transverse anti-slip bar 41 is greater than a width of the second transverse anti-slip bar 42. A height of the first transverse anti-slip bar 41 and a height of the second transverse anti-slip bar 42 are identical. The second transverse anti-slip bars 42 are provided between every two of the first transverse anti-slip bars 41. This structure is simple to arrange, easy for demoulding, and makes an outer surface of the first anti-slip pad 4 look more concise and beautiful. More importantly, when the clamping component and the blocking plate clamp a fishing rod, the anti-slip transverse bars are perpendicular to the fishing rod, which improves the anti-slip performance and prevents wear on the fishing rod.

In this embodiment, the fishing rod holder further includes second anti-slip pads 5. The second anti-slip pad 5 is arranged on the blocking plate 2 and opposite to the first anti-slip pad 4 of the corresponding clamping component 3, further stabilizing the installation of the fishing rod on the fishing rod holder, and further improving customer experience.

In this embodiment, insertion slots 21 are defined in two ends of one side surface of the blocking plate 2 equipped with the second anti-slip pad 5. Two ends of the second anti-slip pad 5 are provided with insertion blocks 51 corresponding to the insertion slots 21. The insertion blocks 51 are detachably inserted into the insertion slots 21, which facilitates the installation of the second anti-slip pad without the need to use a bolt which is more complex for installation, thereby simplifying the installation process.

In this embodiment, the insertion block 51 is in interference fit with the insertion slot 21. The insertion block has a certain degree of elasticity. The interference fit makes the installation of the insertion block more stable.

In this embodiment, the insertion slot 21 is arranged in a trapezoidal shape, and a width of the insertion slot 21 gradually decreases in a direction away from a bottom portion of the insertion slot 21, which makes the installation of the insertion block more stable and prevents the insertion block from easily falling off from the blocking plate. Moreover, the trapezoidal arrangement is more designed, making the appearance of the fishing rod holder more designed.

In this embodiment, an outer surface of the second anti-slip pad 5 is provided with a plurality of third transverse anti-slip bars 52 and a plurality of fourth transverse anti-slip bars 53, and both the third transverse anti-slip bars 52 and the fourth transverse anti-slip bars 53 are transversely distributed on the second anti-slip pad 5. A width of the third transverse anti-slip bar 52 is greater than a width of the fourth transverse anti-slip bar 53. A height of the third transverse anti-slip bar 52 and a height of the fourth transverse anti-slip bar 53 are identical. The fourth transverse anti-slip bars 53 are provided between every two of the third transverse anti-slip bars 52. This structure is simple to arrange, easy for demoulding, and makes the appearance of an outer surface of the second anti-slip pad 5 look more concise and beautiful. More importantly, when the clamping component and the blocking plate clamp the fishing rod, the anti-slip transverse bars are perpendicular to the fishing rod, which improves the anti-slip performance and prevents wear on the fishing rod.

In this embodiment, the plurality of clamping components 3 each includes an abutting member 31 and an elastic restoration member 32. The abutting member 31 is used for clamping the fishing rod with the corresponding blocking plate 2. The elastic restoration member 32 is arranged between the abutting member 31 and the bottom plate 1. The elastic restoration member 32 is used for driving one end of the abutting member 31 that is away from the corresponding blocking plate 2 to approach the corresponding blocking plate 2 when the abutting member 31 is moved away from the corresponding blocking plate 2 by the external force. That is to say, the elastic restoration member 32 drives the abutting member to have a restoration force, and the abutting member and the blocking plate clamp the fishing rod. The elastic restoration member can be a spring, a tension spring, a rubber or other elastic product.

In this embodiment, the bottom plate 1 is provided with first installation columns 11. The abutting member 31 is provided with a second installation column 311. The first installation column 11 and the second installation column 311 are mutually inserted and are movable relative to each other. The elastic restoration member 32 is rotatably sleeved on the first installation column 11 and the second installation column 311, and the elastic restoration member 32 is provided with a first extension end 321 and a second extension end 322. The first extension end is connected to the bottom plate 1, and the second extension end 322 abuts against the abutting member 31. When one end of the abutting member 31 near the corresponding blocking plate 2 moves away from the corresponding blocking plate 2, the second extension end 322 has a restoration force, and the second extension end 322 drives the end of the abutting member 31 that is away from the corresponding blocking plate 2 to approach the corresponding blocking plate 2. The elastic restoration member of this structure not only has strong elastic restoration force, but also can be used through the arrangement of two installation columns, making the structure relatively simple and easy for manufacturers to install and arrange. Moreover, under the condition that the clamping component 3 can be telescopically moved and can be moved away from the corresponding blocking plate, the cost of this structure is relatively low, greatly reducing the production cost of the fishing rod holder.

In this embodiment, a first installation slot 111 is defined in the bottom plate 1 and is positioned on a periphery of the first installation column 11. The bottom plate 1 is also provided with a second installation slot 12 and a first installation hole 13. The second installation slot 12 is in communication with the first installation slot 111, and the first installation hole 13 is defined in the second installation slot 12 and is far away from the first installation slot 111. A main body of the elastic restoration member 32 is arranged in the first installation slot 111. The first extension end 321 is arranged in the second installation slot 12, and one end of the first extension end 321 far away from the main body of the elastic restoration member 32 is inserted into the first installation hole 13, so that the first extension end 321 is fixed in the second installation slot 12. This structure makes the installation of the elastic restoration member more stable and ensures the stable usability of the fishing rod holder.

In this embodiment, the plurality of clamping components 3 also each includes a fixing member 33. The bottom plate 1 is provided with second installation holes 14 corresponding to the first installation columns 11. The second installation hole 14 penetrates through the bottom plate 1. The fixing member 33 is inserted into the first installation column 11 and the second installation column 311 through the second installation hole 14, and the fixing member 33 fixes the second installation column 311 to the first installation column 11. The second installation column 311 is movably connected to the fixing member 33. The fixing member 33 is mainly connected to the abutting member 31, so that the abutting member can move while not detaching from the bottom plate, ensuring the stability of the use of the fishing rod holder.

In this embodiment, the fixing member 33 is a bolt or a screw. The bolt and the screw are commonly used fixing products in the market, which are less costly and have good fixing properties, and are also easy for the user to dismantle damaged clamping component.

In this embodiment, the clamping component 3 is provided with three side surfaces. A first side surface 301 of the clamping component 3 is arranged opposite to the corresponding blocking plate 2. A second side surface 302 of the clamping component 3 is arranged opposite to the first side surface 301 of the clamping component 3. A third side surface 303 of the clamping component 3 is connected to the first side surface 301 of the clamping component 3 and the second side surface 302 of the clamping component 3. The third side surface 303 of the clamping component 3 is arranged far away from the corresponding blocking plate 2. The first side surface 301 of the clamping component 3 is connected to the second side surface 302 of the clamping component 3 to form a conical shape. The first side surface 301 of the clamping component 3 is arranged in a smooth arc shape. The arrangement of this structure makes the volume of the clamping component smaller, and also makes the appearance of the clamping component more design oriented, which can enhance customers' purchasing desire. In addition, the arrangement of the smooth arc shape of the first side surface 301 of the clamping component 3 is convenient for the user to apply force to the clamping component, and facilitates the use of the product.

In this embodiment, the second side surface 302 of the clamping component 3 is provided with a first plane 3021 and a second plane 3022. The first plane 3021 and the second plane 3022 are connected and form an included angle α greater than 90 degrees. The first plane 3021 is connected to the first side surface 301 of the clamping component 3, and an extension line of the first plane 3021 is perpendicular to the third side surface 303. This angle arrangement further makes the appearance of the fishing rod holder more designed.

In this embodiment, the second side surface 302 of the clamping component 3 is also provided with a third plane 3023. The third plane 3023 is connected to the third side surface 303 of the clamping component 3 and the second plane 3022. The third plane 3023 is parallel to the first plane 3021. This arrangement further makes the appearance of the fishing rod holder more designed.

In this embodiment, the clamping component 3 includes a hollow column 34 and a cover plate 35. The cover plate 35 covers a top portion of the hollow column 34, and a side wall of the cover plate 35 encloses the hollow column 34. The first plane 3021 and the second plane 3022 are both arranged on the side wall of the cover plate 35. This arrangement further makes the appearance of the fishing rod holder more designed, and makes the overall fishing rod holder lighter, easier to carry and store.

In this embodiment, anti-slip patterns 15 are provided on both sides of a length direction of the bottom plate 1, which not only enhances aesthetics but also facilitates the installation of the fishing rod holder by the user.

In this embodiment, one of the clamping components 3 is provided between two of the blocking plates 2, and the clamping component 3 is rotatable between the two of the blocking plates 2. The clamping component 3 has the restoration force when rotated by the external force. The arrangement of the clamping component 3 being rotatable conforms to ergonomics and is convenient for the user to use.

Overall, the fishing rod holder in this embodiment can store a plurality of fishing rods. Moreover, the fishing rod holder has a simple structure, low cost, and high practicality, solving the problem of fishing enthusiasts needing to purchase a plurality of storage racks to store a plurality of fishing rods, and the problem of the complex design of existing fishing rod racks that require many processes to ensure stable placement of the fishing rods on the storage racks, thereby greatly improving the user experience.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:
1. A fishing rod holder, comprising:
a bottom plate;
a plurality of blocking plates;
a plurality of first anti-slip pads; and
a plurality of clamping components;
wherein the plurality of blocking plates and the plurality of clamping components are all arranged on an identical surface of the bottom plate; one of the plurality of clamping components is provided corresponding to one of the plurality of blocking plates; one end of the clamping component is adjacent to the corresponding blocking plate and is movable away from the corresponding blocking plate under an external force; when the one end of the clamping component is driven away from the corresponding blocking plate by the external force, the clamping component has a restoration force, so that the clamping component approaches the corresponding blocking plate when the clamping component is driven away from the corresponding blocking plate by the external force; and when the one end of the clamping component is driven away from the corresponding blocking plate by the external force, a clamping space is configured to be formed between the clamping component and the corresponding blocking plate,
wherein each first anti-slip pad is disposed on one side of the clamping component near the corresponding blocking plate,
wherein an outer surface of the first anti-slip pad is provided with a plurality of first transverse anti-slip bars and a plurality of second transverse anti-slip bars; both the plurality of first transverse anti-slip bars and the plurality of second transverse anti-slip bars are transversely distributed on the first anti-slip pad; a width of the first transverse anti-slip bar is greater than a width of the second transverse anti-slip bar; a height of the first transverse anti-slip bar and a height of the second transverse anti-slip bars are identical; and the plurality of second transverse anti-slip bars are provided between every two of the plurality of first transverse anti-slip bars.

2. The fishing rod holder according to claim 1, wherein the first anti-slip pad is transversely distributed on the clamping component.

3. The fishing rod holder according to claim 1, further comprising second anti-slip pads, wherein each second anti-slip pad is arranged on the blocking plate and opposite to the first anti-slip pad of the corresponding clamping component.

4. The fishing rod holder according to claim 1, wherein the plurality of clamping components each comprises an abutting member and an elastic restoration member; the abutting member is used for clamping a fishing rod with the corresponding blocking plate; the elastic restoration member is arranged between the abutting member and the bottom plate; and the elastic restoration member is used for driving one end of the abutting member that is away from the corresponding blocking plate to approach the corresponding blocking plate when the abutting member is moved away from the corresponding blocking plate by the external force.

5. The fishing rod holder according to claim 1, wherein the clamping component is provided with three side surfaces; a first side surface of the clamping component is arranged opposite to the corresponding blocking plate; a second side surface of the clamping component is arranged opposite to the first side surface of the clamping component; a third side surface of the clamping component is connected to the first side surface of the clamping component and the second side surface of the clamping component; the third side surface of the clamping component is arranged away from the corresponding blocking plate; the first side surface of the clamping component is connected to the second side surface of the clamping component to form a conical shape; and the first side surface of the clamping component is arranged in a smooth arc shape.

6. The fishing rod holder according to claim 1, wherein one of the plurality of clamping components is provided between two of the plurality of blocking plates; the clamping component is rotatable between the two of the plurality of blocking plates; and the clamping component has the restoration force when rotated by the external force.

7. A fishing rod holder, comprising:
a bottom plate;
a plurality of blocking plates;
a plurality of first anti-slip pads;
a plurality of second anti-slip pads; and
a plurality of clamping components;
wherein the plurality of blocking plates and the plurality of clamping components are all arranged on an identical surface of the bottom plate; one of the plurality of clamping components is provided corresponding to one of the plurality of blocking plates; one end of the clamping component is adjacent to the corresponding blocking plate and is movable away from the corresponding blocking plate under an external force; when the one end of the clamping component is driven away from the corresponding blocking plate by the external force, the clamping component has a restoration force, so that the clamping component approaches the corresponding blocking plate when the clamping component is driven away from the corresponding blocking plate by the external force; and when the one end of the clamping component is driven away from the corresponding blocking plate by the external force, a clamping space is configured to be formed between the clamping component and the corresponding blocking plate, wherein each first anti-slip pad is disposed on one side of the clamping component near the corresponding blocking plate, wherein each second anti-slip pad is arranged on the blocking plate and opposite to the first anti-slip pad of the corresponding clamping component, wherein insertion slots are defined in two ends of one side surface of the blocking plate equipped with the second anti-slip pad; two ends of the second anti-slip pad are provided with insertion blocks corresponding to the insertion slots; and the insertion blocks are detachably inserted into the insertion slots.

8. The fishing rod holder according to claim 7, wherein each insertion block is in interference fit with each insertion slot.

9. The fishing rod holder according to claim 7, wherein each insertion slot is arranged in a trapezoidal shape; and a width of each insertion slot gradually decreases in a direction away from a bottom portion of the insertion slot.

10. A fishing rod holder, comprising:
a bottom plate;
a plurality of blocking plates;
a plurality of first anti-slip pads;
a plurality of second anti-slip pads; and
a plurality of clamping components;
wherein the plurality of blocking plates and the plurality of clamping components are all arranged on an identical surface of the bottom plate; one of the plurality of clamping components is provided corresponding to one of the plurality of blocking plates; one end of the clamping component is adjacent to the corresponding blocking plate and is movable away from the corresponding blocking plate under an external force; when the one end of the clamping component is driven away from the corresponding blocking plate by the external force, the clamping component has a restoration force, so that the clamping component approaches the corresponding blocking plate when the clamping component is driven away from the corresponding blocking plate by the external force; and when the one end of the clamping component is driven away from the corresponding blocking plate by the external force, a clamping space is configured to be formed between the clamping component and the corresponding blocking plate, wherein each first anti-slip pad is disposed on one side of the clamping component near the corresponding blocking plate, wherein each second anti-slip pad is arranged on the blocking plate and opposite to the first anti-slip pad of the corresponding clamping component, wherein an outer surface of the second anti-slip pad is provided with a plurality of first transverse anti-slip bars and a plurality of second transverse anti-slip bars; both the plurality of first transverse anti-slip bars and the plurality of second transverse anti-slip bars are transversely distributed on the second anti-slip pad; a width of the first transverse anti-slip bar is greater than a width of the second transverse anti-slip bar; a height of the first transverse anti-slip bar and a height of the second transverse anti-slip bar are identical; and the plurality of second transverse anti-slip bars are provided between every two of the plurality of first transverse anti-slip bars.

11. A fishing rod holder, comprising:
a bottom plate;
a plurality of blocking plates; and
a plurality of clamping components;
wherein the plurality of blocking plates and the plurality of clamping components are all arranged on an identical surface of the bottom plate; one of the plurality of clamping components is provided corresponding to one of the plurality of blocking plates; one end of the clamping component is adjacent to the corresponding blocking plate and is movable away from the corresponding blocking plate under an external force; when the one end of the clamping component is driven away from the corresponding blocking plate by the external force, the clamping component has a restoration force, so that the clamping component approaches the corresponding blocking plate when the clamping component is driven away from the corresponding blocking plate by the external force; and when the one end of the clamping component is driven away from the corresponding blocking plate by the external force, a clamping space is configured to be formed between the clamping component and the corresponding blocking plate, wherein the plurality of clamping components each comprises an abutting member and an elastic restoration member; the abutting member is used for clamping a fishing rod with the corresponding blocking plate; the elastic restoration member is arranged between the abutting member and the bottom plate; and the elastic restoration member is used for driving one end of the abutting member that is away from the corresponding blocking plate to approach the corresponding blocking plate when the abutting member is moved away from the corresponding blocking plate by the external force, wherein the bottom plate is provided with first installation columns; the abutting member is provided with a second installation column; one of the first installation columns and a corresponding one of the second installation columns are mutually inserted and are movable relative to each other; the elastic restoration member is rotatably sleeved on the first installation column and the second installation column; the elastic restoration member is provided with a first extension end and a second extension end; the first extension end is connected to the bottom plate; the second extension end abuts against the abutting member; and when one end of the abutting member near the corresponding blocking plate moves away from the corresponding blocking plate, the second extension end has a restoration force, and the second extension end drives a second end of the abutting member that is away from the corresponding blocking plate to approach the corresponding blocking plate.

12. The fishing rod holder according to claim 11, wherein a first installation slot is defined in the bottom plate and is positioned on a periphery of a respective one the first installation columns; the bottom plate is also provided with a second installation slot and a first installation hole; the second installation slot is in communication with the first installation slot; the first installation hole is defined in the second installation slot and is away from the first installation slot; a main body of the elastic restoration member is arranged in the first installation slot; the first extension end is arranged in the second installation slot; and one end of the first extension end away from the main body of the elastic restoration member is inserted into the first installation hole, so that the first extension end is fixed in the second installation slot.

13. The fishing rod holder according to claim 11, wherein the plurality of clamping components also each comprises a fixing member; the bottom plate is provided with installation holes corresponding to the first installation columns; the installation holes penetrate through the bottom plate; the fixing member is inserted into the first installation columns and the second installation column through the second installation holes; the fixing member fixes the second installation column to the first installation columns; and the second installation column is movably connected to the fixing member.

14. The fishing rod holder according to claim 13, wherein the fixing member is a bolt or a screw.

15. A fishing rod holder, comprising:
a bottom plate:
a plurality of blocking plates; and
a plurality of clamping components;
wherein the plurality of blocking plates and the plurality of clamping components are all arranged on an identical surface of the bottom plate: one of the plurality of clamping components is provided corresponding to one of the plurality of blocking plates; one end of the clamping component is adjacent to the corresponding blocking plate and is movable away from the corresponding blocking plate under an external force; when the one end of the clamping component is driven away from the corresponding blocking plate by the external force, the clamping component has a restoration force, so that the clamping component approaches the corresponding blocking plate when the clamping component is driven away from the corresponding blocking plate by the external force; and when the one end of the clamping component is driven away from the corresponding blocking plate by the external force, a clamping space is configured to be formed between the clamping component and the corresponding blocking plate, wherein the clamping component is provided with three side surfaces: a first side surface of the clamping component is arranged opposite to the corresponding blocking plate; a second side surface of the clamping component is arranged opposite to the first side surface of the clamping component; a third side surface of the clamping component is connected to the first side surface of the clamping component and the second side surface of the clamping component; the third side surface of the clamping component is arranged away from the corresponding blocking plate; the first side surface of the clamping component is connected to the second side surface of the clamping component to form a conical shape; and the first side surface of the clamping component is arranged in a smooth arc shape, wherein the second side surface of the clamping component is provided with a first plane and a second plane; the first plane and the second plane are connected and form an included angle α greater than 90 degrees; the first plane is connected to the first side surface of the clamping component; and an extension line of the first plane is perpendicular to the third side surface.

16. The fishing rod holder according to claim 15, wherein the second side surface of the clamping component is also provided with a third plane; the third plane is connected to the third side surface of the clamping component and the second plane; and the third plane is parallel to the first plane.

17. The fishing rod holder according to claim 15, wherein the clamping component comprises a hollow column and a cover plate; the cover plate covers a top portion of the hollow column; a side wall of the cover plate encloses the hollow column; and the first plane and the second plane are both arranged on the side wall of the cover plate.

18. The fishing rod holder according to claim 17, wherein anti-slip patterns are provided on both sides of a length direction of the bottom plate.

* * * * *